March 18, 1969 H. L. SWALUW 3,433,980

PLURAL CHANNEL DELAY LINE CIRCUIT FOR PROCESSING A PAL COLOR TELEVISION SIGNAL

Filed April 18, 1967

INVENTOR.
HARRY L. SWALUW
BY
Frank R. Trifari
AGENT

INVENTOR.
HARRY L. SWALUW
BY
Frank R. Jifari
AGENT

Patented Mar. 18, 1969

3,433,980

PLURAL CHANNEL DELAY LINE CIRCUIT FOR PROCESSING A PAL COLOR TELEVISION SIGNAL

Harry Leman Swaluw, Emmasingel, Eindhoven, Netherlands, assignor to North American Philips Company, Inc., New York, N.Y., a corporation of Delaware
Filed Apr. 18, 1967, Ser. No. 631,647
Claims priority, application Netherlands, Aug. 25, 1966, 6611942
U.S. Cl. 307—293 8 Claims
Int. Cl. H03k *17/26, 17/28*

ABSTRACT OF THE DISCLOSURE

A circuit is disclosed having a delayed branch and an undelayed branch between common input and output terminals. The delayed branch includes a delay line having a pair of outputs, whereby the signals at the outputs are in phase opposition. The output of the undelayed branch is added each output of the delay line with the same phase. A tuned circuit is provided to control the relative phases of the two branches. The circuit is useful in a PAL color television circuit, in which the delay time of the delayed branch is equal to a line period.

The invention relates to a circuit arrangement for processing PAL colour television signals including a common input terminal, two common output terminals, a first branch including a delay line for delaying by one line period the television signal applied thereto, and at least one second branch, the output terminals of the first and of the second branch being connected to the said two output terminals of the arrangement.

Circuit arrangements of the said kind are known in which the PAL input signal is directly added through a second branch to the signal at one output terminal of the delay line and the pase of this PAL input signal must first be inverted through a third branch, whereupon this signal must be added to the same signal at one output terminal of the delay line. One addition yields a first and the other addition a second colour signal, which colour signals can further be demodulated in known manner. It appears from the foregoing that the known arrangement must necessarily include at least two additional branches apart from the branch including the delay line, while moreover one of the two additional branches must include a phase inverter element.

The object of the invention is to provide a circuit arrangement in which in principle only one additional branch is sufficient and moreover a phase inverter element may be dispensed with.

In order to attain this end, the circuit arrangement in accordance with the invention is characterized in that the delay line has two output terminals from which two signals are derived which are in relative phase opposition, provision being made of means for connecting each of the the two output terminals of the delay line to one of two common output terminals of the arrangement and of means for adding the input signal through the said second branch to each of the signals at the two output terminals of the delay line for obtaining one of the two colour signals from the PAL television signal at each of the common output terminals.

A few possible embodiments of circuit arrangements in accordance with the invention will now be described with reference to the accompanying figures, of which:

Figure 1:
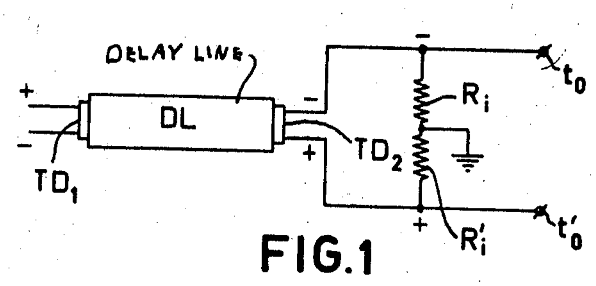
FIGURE 1 shows the basic circuit diagram of a delay line having two outputs.

Referring now to FIGURE 1, reference mark DL denotes a delay line used in circuit arrangements for processing a PAL colour television signal. The delay line DL delays the incoming signal by one line period, which corresponds roughly to 64 microseconds for a 625 lines system. There is applied to the input terminals of this delay circuit the PAL television signal which in the case of a new-new PAL system may be written for a first line period as $$E_1=\alpha(R-Y)\cos\omega t+\beta(B-Y)\sin\omega t$$

and for the next line period as $$E_2=-\alpha(R-Y)\cos\omega t+\beta(B-Y)\sin\omega t$$

and so on.

In this signal, $\alpha$ and $\beta$ are coefficients determined by the system, $R-Y$ is the red and $B-Y$ is the blue colour difference signal, while $\omega=2\pi f$, $f$ representing the frequency of the colour subcarrier.

At the instant at which the signal $E_1$ has been delayed by one line period, that is to say when it appears at the output terminal of the delay line DL, the signal $E_2$ appears at the output terminals. If this delayed signal is denoted by $E_{1\,to}$, it invariably appears at the same instant as $E_2$ and it has the same form as the signal $E_1$. If the signal $E_2$ has been delayed by one line period in the delay line DL and if this delayed signal is denoted by $E_{2\,to}$, it appears at the output of the delay line DL at the instant at which the signal $E_1$ appears at its input. In the circuit arrangement of FIGURE 1, however, two delayed signals are produced, that is to say at the output terminals $t_0$ and $t_0'$. The signals appearing at these two outputs are relatively shifted in phase by 180°. This may be explained as follows.

FIGURE 1 shows a delay line DL having an input transducer $TD_1$ and an output transducer $TD_2$. The input transducer $TD_1$ converts the incoming electric signal into acoustic energy. This acoustic energy travels along the delay line DL and is converted again into electric energy by the transducer $TD_2$.

The term delay is to be understood to mean a given number of periods by which the signal at the output transducer $TD_2$ has been delayed with respect to the signal at the input transducer $TD_1$. The number of periods may also be considered as an even number of phase shifts $\pi$, that is to say $2n\pi$ phase shifts, $n$ being an integer. Due to the fact that the colour subcarrier frequency is a multiple of half the line frequency, the number of phase shifts of a signal delayed accurately by one line period is equal to: $(2n+1)\pi$ radians. This means that the signal at the input of transducer $TD_1$ (the input phase of which is marked by the signs + − at the input terminals of the transducer $TD_1$) is shifted in phase by 180° with respect to the signal at the output transducer $TD_2$ (therefore the phase at the output of $TD_2$ is marked in FIGURE 1 by the signs − +).

If the junction of the two resistors $R_1$ and $R_1'$ which have the same resistance values is earthed, the voltage at the output terminal $t_0$ is shifted with respect to earth by 180° in phase relative to the voltage at the output terminal $t_0'$. In other words, the voltage at the resistor $R_1$ is shifted by 180° with respect to that at the resistor $R_1'$.

Figure 2:
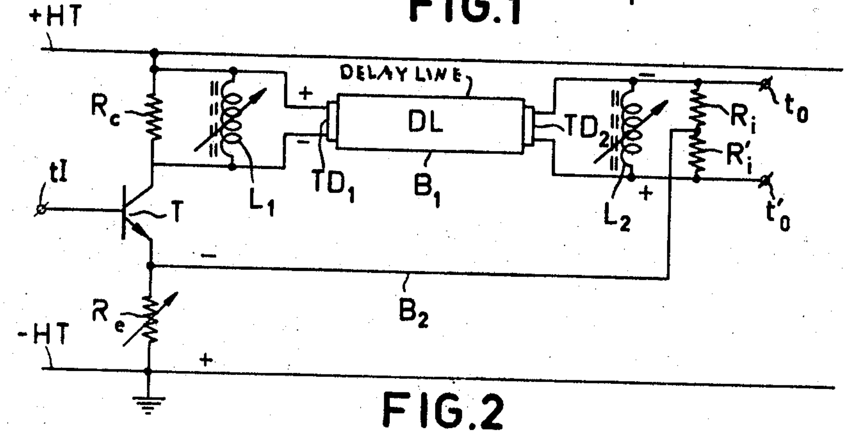
FIGURE 2 shows a first embodiment of a colour-processing circuit arrangement in accordance with the invention including one additional branch.

Upon consideration of the circuit arrangement of FIGURE 2, it should be appreciated that, when the junction of the resistors $R_1$ and $R_1'$ is not earthed but is connected to the emitter electrode of a transistor T, the various phases of the signals at the inputs and at the outputs must be compared with each other. If, as above, the input signals produced across the collector resistor $R_c$ are denoted by $E_1$ and $E_2$, these signals are marked by the signs + — at the input terminals of the input transducer $TD_1$. In this case, the signals produced across the emitter resistor $R_e$ are in phase opposition due to the operation of the transistor T. This means that the signals across the emitter resistor $R_e$ may be written as $-E_1$ and $-E_2$, respectively. These signals have the same phase as the input signals applied to the input terminal $tI$, which common input terminal is connected to the base electrode of transistor T. As shown with the aid of the circuit arrangement of FIGURE 1, the voltages across resistor $R_1'$ are in phase with the voltages across the input transducer $TD_1$. Therefore, these voltages may be written as $E_{1\,to}'$ and as $E_{2\,to}'$, respectively.

The voltages across resistor $R_1$ are in phase opposition to the voltages across the input transducer $TD_1$ so that these voltages may be written as $-E_{1\,to}$ and $-E_{2\,to}$, respectively. It should be appreciated that the voltages across the resistors $R_1$ and $R_1'$ must be added to the voltage across the emitter resistor $R_e$ in order to obtain the desired colour output signals. The total voltages at the output terminals $t_o$ and $t_o'$ with respect to earth can therefore be found as follows. For a first line period the voltage at the output terminal $t_o$ is given by:

$$(-E_1)+(-E_{2\,to})=-\alpha(R-Y)\cos\omega t-\beta(B-Y)\sin\omega t+\alpha(R-Y)\cos\omega t-\beta(B-Y)\sin\omega t=-2\beta(B-Y)\sin\omega t \quad (3)$$

For the next line period, the voltage at the output terminal $t_o$ is:

$$(-E_2)+(-E_{1\,to})=+\alpha(R-Y)\cos\omega t-\beta(B-Y)\sin\omega t-\alpha(R-Y)\cos\omega t-\beta(B-Y)\sin\omega t=-2\beta(B-Y)\sin\omega t \quad (4)$$

It is apparent from the Equations 3 and 4 that at the output terminal $t_o$ the red colour difference signal $R-Y$ disappears and the blue colour difference signal $B-Y$ appears.

It can be shown in the same manner that for a first line period, the voltage at the output $t_o'$ is given by:

$$(-E_1)+E_{2\,to}')=-\alpha(R-Y)\cos\omega t-\beta(B-Y)\sin\omega t-\alpha(R-Y)\cos\omega t+\beta(B-Y)\sin\omega t=-2\alpha(R-Y)\cos\omega t \quad (5)$$

For the next line period, the voltage at the output terminal $t_o'$ has the form:

$$(-E_2)+(E_{1\,to}')=+\alpha(R-Y)\cos\omega t-\beta(B-Y)\sin\omega t+\alpha(R-Y)\cos\omega t+\beta(B-Y)\sin\omega t=+2\alpha(R-Y)\cos\omega t \quad (6)$$

It is apparent from the Equations 5 and 6 that only the red colour difference signal $R-Y$ appears at the output terminal $t_o'$.

It should be appreciated that, if another PAL signal, for example, a signal in which signals I and Q modulate in quadrature the colour subcarrier and the signal I should be shifted in phase from line to line by 180°, the Q signal would appear at the output terminal $t_o$ and the I signal would appear at the output terminal $t_o'$.

It will appear from the foregoing that the amplitudes of the signals $-E_1$; $-E_2$; $E_{1\,to}'$; $E_{2\,to}'$; $-E_{1\,to}$ and $-E_{2\,to}$ must be accurately equal to each other in order to ensure that the desired colour signals appear at the output terminals $t_o$ and $t_o'$ and the undesired colour components compensate each other. The equality of the various amplitudes may be adjusted in a simple manner by means of the variable emitter resistor $R_e$.

In the PAL processing circuit arrangement of FIGURE 2, delay line DL is made of glass and has piezo-electric output and input transducers $TD_1$ and $TD_2$, respectively, each provided with two terminals. The stray capacitance between the said terminals may be tuned by means of the variable inductances $L_1$ and $L_2$ to the colour subcarrier frequency.

Practical values of the components of the arrangement of FIGURE 2 are stated by way of example in the table below:

| | |
|---|---|
| Resistor $R_c$ | 150Ω. |
| Resistor $R_e$ | Variable between 220Ω and 320Ω. |
| Resistors $R_1$ and $R_1'$ | Each 75Ω. |
| Transistor T | Mullard type BF115. |
| Delay line DL | 63.943 μsec. for a PAL colour, subcarrier frequency of 4.43361875 mc./s. |

The signals at the output terminals $t_o$ and $t_o'$ may be applied to known synchronous demodulators which supply the red $(R-Y)$ colour signal and the blue $(B-Y)$ colour signal, respectively, if a new-new PAL signal is received, or signals I and Q as in the prior PAL system.

As already suggested by Bruch, subcarrier signals produced by the local subcarrier oscillator may alternatively be applied to the input terminal tI. Such a subcarrier signal is composed of two signals the phases of which are relatively shifted by 90°, like the phases of the signals $(R-Y)$ and $(B-Y)$, respectively, or of the signals I and Q, respectively, modulating the colour subcarrier. One of the two phases of this local colour subcarrier signal which corresponds either to the $(R-Y)$ phase or to the I phase is shifted from line to line by 180° before the whole signal is applied to the input terminal $tI$. In this event, it can be shown in the same manner as for the colour signals proper that each colour signal at the output terminals $t_o$ and $t_o'$ has added to it the local subcarrier signal having the correct phase. The signals at the output terminals $t_o$ and $t_o'$ may then be directly applied to conventional peak detectors which are cheaper than the aforementioned synchronous demodulators.

It should be noted that the circuit arrangement of FIGURE 2 comprises only two branches, i.e., a first branch $B_1$ including the delay line DL and a second branch $B_2$ consisting of a single connection line between the emitter electrode of transistor T and the junction of the resistors $R_1$ and $R_1'$.

Figure 3:
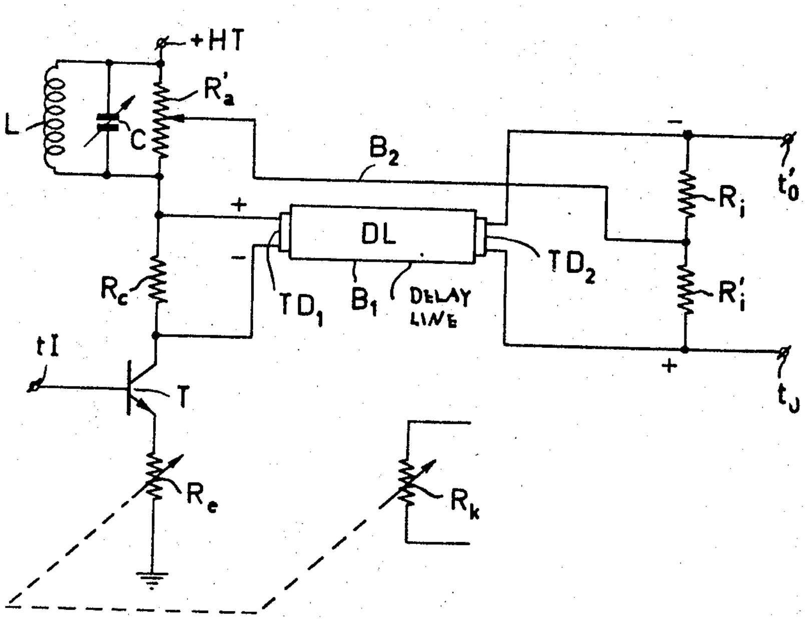
FIGURE 3 illustrates an embodiment slightly different from that of FIGURE 2.

FIGURE 3 shows a circuit arrangement slightly different from that of FIGURE 2. In this circuit arrangement, the collector resistor $R_c$ has connected in series with it a further resistor $R_a'$ to the variable tapping of which is connected the input terminal of the second branch $B_2$. In this circuit arrangement, balancing is obtained by means of the variable tapping on the resistor $R_a'$. The emitter circuit is provided also in this case with a variable emitter sistor $R_e$ may be coupled with that of the contrast control. signals can be adjusted. For if the resistor $R_e$ decreases, the negative feedback decreases and hence the amplification of transistor T increases. The output signal consequently increases. Alternatively, the operation of the resistor $R_e$. Both arrows indicate that the resistors $R_e$ and This is shown diagrammatically in FIGURE 3 in that the arrow passing through the contrast potentiometer $R_k$ is coupled with the arrow passing through the emitter resistor $R_a$. Both arrows indicate that the resistors $R_e$ and $R_k$ can be varied by mechanical means.

Figure 4:
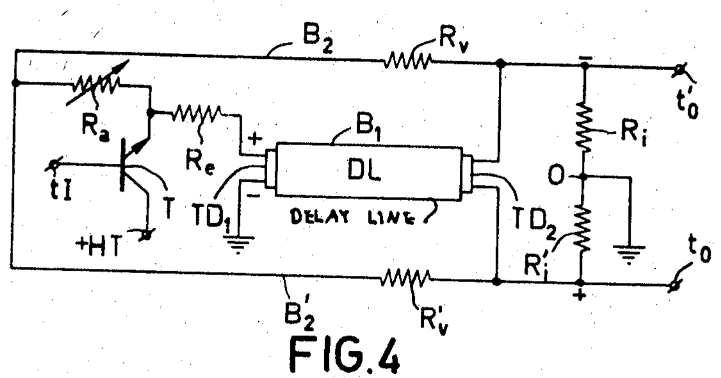
FIGURE 4 shows an embodiment including two additional branches.

In the embodiment of FIGURE 4, the second branch $B_2$ is subdivided into two further branches $B_2$ and $B_2'$ including the resistors $R_v$ and $R_v'$, respectively, which are each connected in series with the resistors $R_1$ and $R_1'$. The resistors $R_v$ and $R_v'$ have the same resistance value. The junction of the resistors $R_v$ and $R_v'$ is connected to one end of the variable resistor $R_a$ the other end of which is connected to the emitter electrode of the transistor. Balancing of the circuit arrangement can be performed by means of the variable resistor $R_a$.

Like in the circuit arrangement of FIGURE 3, in FIGURE 4 the output terminals $t_o$ and $t_o'$ are interchanged as compared with the circuit arrangement of FIGURE 2.

This is due to the fact that the signal applied through the second branch $B_2$ and $B_2'$, respectively, is in phase with the signal applied to the input transducer $TD_1$, whereas in the circuit arrangement of FIGURE 2 the signal applied via the second branch $B_2$ is in phase opposition to the signal applied to the input transducer $TD_1$.

It will be evident that the resistance network $R_1$, $R_1'$ may alternatively be replaced by a transformer the primary of which is connected to the transducer $TD_2$ while its secondary is connected to the output terminals $t_o$ and $t_o'$. The centre tapping on this secondary may be connected either to the emitter of transistor T (cf. FIGURE 2) or to the tapping on resistor $R_a'$ (cf. FIGURE 3). If desired, the primary may be adjusted so that the additional tuning inductance $L_2$ is dispensed with.

It should further be noted that in the circuit arrangement in accordance with the invention, a given error occurring in the delay line DL can very readily be corrected.

For as has been assumed in the foregoing, the delayed signal was shifted in actual fact by $(2n+1)\pi$ radians. However, if a given inaccuracy occurs in the delay line, it may be necessary that the determined angle $\varphi$ should be added to or subtracted from this number of phase shifts. In a delay line having only one input, this is simple, since in this case an additional phase-shift network may be connected in series with this single output. In a circuit arrangement according to the invention, however, this may alternatively be achieved in that the phase shift network is included in the additional branch $B_2$ (cf., for example, FIGURE 3) or in the common part of the additional branches $B_2$ and $B_2'$.

Figure 5:
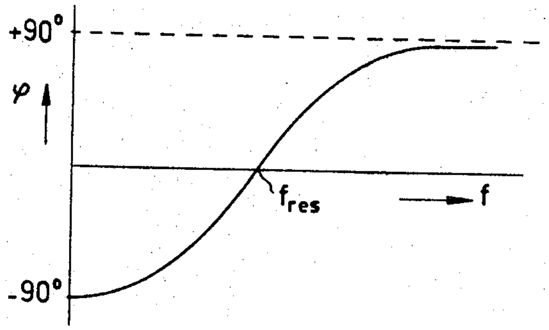

For in FIGURE 3, there is connected in parallel with the resistor $R_a'$ an LC-circuit consisting of an inductance L and a variable capacitor C. The variation of the phase $\varphi$ as a function of the frequency for the circuit L, C, $R_a$ is shown in FIGURE 5. If this circuit is correctly tuned to the subcarrier frequency (hence $f_{colour\ carrier}=f_{res.}$), the phase shift in the circuit is zero. If it is ensured that the quality Q of this circuit is such that the inclination $d\varphi/d\omega=d\varphi/2\pi df$ which determines the angular phase velocity of the signals is constant and substantially equal to that of the delay line DL in the proximity of the resonance frequency $f_{res.}$, a phase shift $-\varphi$ is introduced into the signal reaching through the branch $B_2$ the junction of the resistors $R_1$ and $R_1'$ in case the circuit L, C, $R_a$ is tuned on the lefthand side of the frequency $f_{res.}$. The overall phase difference between the signals reaching the output terminals through the branches $B_1$ and $B_2$ consequently is $(2n+1)\pi+\varphi$. Since the angular phase velocity $d\varphi/d\omega$ of the delay line and that of the circuit L, C, $R_a$ is the same, the additional phase shift $\varphi$ will be the same for all the side bands of the signal.

It should be appreciated that, in the case of a tuning on the righthand side of the frequency $f_{res.}$, a phase angle $+\varphi$ is introduced into the signal of the branch $B_2$ and the overall phase difference between the signals of the branches $B_1$ and $B_2$ is then $(2n+1)\pi-\varphi$. Consequently, any desired phase shift, i.e., any desired delay time, can be adjusted by means of the circuit L, C, $R_a$.

Figure 6:
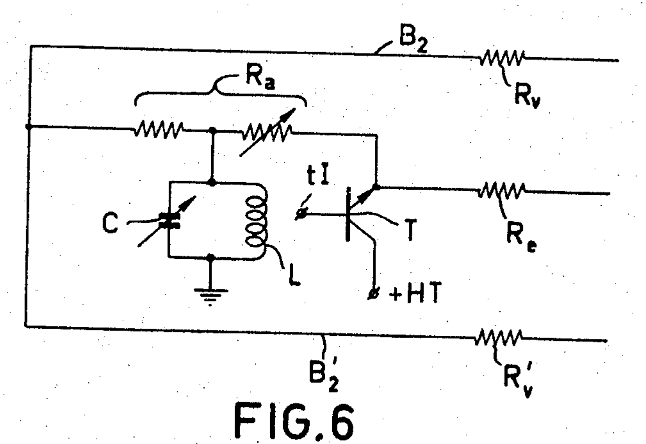

This may also be achieved in the circuit arrangement of FIGURE 4 when, as shown in FIGURE 6, the circuit LC is included in the common part of the branches $B_2$ and $B_2'$. For this purpose, the resistor $R_a$ of FIGURE 4 is subdivided into two resistors $R_{a1}$ and $R_{a2}$ and the circuit LC is connected between the junction of these two resistors and earth. It should be appreciated that the circuit LC of FIGURE 6 is similar to the tunable circuit of FIGURE 3.

Although a parallel circuit has been described hereinbefore, it will be evident that a series circuit may also readily be utilized. Only is the phase variation $\varphi$ of the latter circuit as a function of the frequency $f$ opposite to that of the circuit in FIGURE 5. This means only, however, that this series circuit must be detuned in a sense opposite to that in a parallel circuit.

I claim:

1. A signal translating circuit for processing PAL color television signals comprising an amplifier device having input, common and output electrodes, a source of said signals connected to said input electrode, a source of operating potential having first and second voltage terminals, an output circuit connected between said output electrode and said first voltage terminal, delay line means having an input connected to said output circuit and a pair of outputs, said delay line means producing signals of relative phase opposition at said pair of outputs and having a delay substantially equal to one line period of said signals, a pair of output terminals, means connecting each output of said delay line means to a separate output terminal, said output circuit comprising means for adding substantially undelayed signals from said output electrode to the output of said delay line means at each output electrode with the same phase, and tuned circuit means connected to control the phase of signals applied to said adding means with respect to the output of said delay line means.

2. The translating circuit of claim 1 in which said output circuit comprises a balancing potentiometer, means connecting said potentiometer in series between said output electrode and first voltage terminal, first and second resistors serially connected between said output terminals, and means connecting the movable tap of said potentiometer to the junction of said first and second resistors, said tuned circuit comprising a parallel resonant circuit, and means connecting said parallel resonant circuit in parallel with said potentiometer.

3. The translating circuit of claim 2 wherein said amplifier device is a transistor, said input, common and output electrodes being the base, emitter and collector electrodes respectively, comprising an unbypassed variable contrast control potentiometer connected between said emitter electrode and the second voltage terminal.

4. The translating circuit of claim 1 wherein said output circuit comprises first and second resistors serially connected between said output terminals, means connecting the junction of said first and second resistors to said first terminal, first and second branch circuits, and means connecting said branch circuits between said output electrode and opposite output terminals.

5. The translating circuit of claim 4 in which said means connecting said branch circuits comprises first and second serially connected resistive means connected between said output electrode and one end of each of said branch circuits, and said tuned circuit comprises a parallel resonant circuit connected between the junction of said resistive means and said first voltage terminal.

6. A signal translating circuit for processing PAL color television signals comprising an input terminal, a source of said signals connected to said input terminal, a first branch circuit means including delay line means, said delay line means having a delay substantially equal to one line period of said signals and having first and second delay output terminals, whereby signals at said delay output terminals are substantially in phase opposition, said translating circuit further comprising first and second signal output terminals, means connecting the first and second delay output terminals to said first and second signal output terminals respectively, first and second resistors connected serially between said first and second output terminals, means connecting the junctions of said first and second resistors to a point of reference potential, second and third substantially non-delaying branch circuit means having their outputs connected to said first and second signal output terminals respectively, and means connecting said input terminal to the inputs of said first, second and third branch circuit means respectively.

7. The translating circuit of claim 6 wherein said means connecting said input terminal to the inputs of said first, second and third branch circuit means comprises means for connecting said input terminal to the input of said first branch circuit means, and common variable balancing resistor means for connecting said input terminal to the inputs of each of said second and third branch circuit means.

8. The translating circuit of claim 7 wherein said balancing resistor means comprises first and second serially connected sections, comprising a parallel resonant circuit connected between the junction of said sections and a point of reference potential, said resonant circuit having a controllable resonant frequency in the proximity of the subcarrier frequency of said signals.

References Cited

UNITED STATES PATENTS

| | | | |
|---|---|---|---|
| 2,437,313 | 3/1948 | Medford | 328—56 X |
| 2,961,609 | 11/1960 | Manring | 328—56 X |
| 3,231,765 | 1/1966 | Martin et al. | 307—293 X |

JOHN S. HEYMAN, *Primary Examiner.*

U.S. Cl. X.R.

307—243; 328—158, 156, 55

UNITED STATES PATENT OFFICE

CERTIFICATE OF CORRECTION

Patent No. 3,433,980 March 18, 1969

Harry Leman Swaluw

It is certified that error appears in the above identified patent and that said Letters Patent are hereby corrected as shown below:

Column 4, line 52, beginning with "sistor $R_e$" cancel all to and including "resistor $R_e$ and", line 57, same column 4, and insert -- resistor $R_e$ by means of which the saturation of the colour signals can be adjusted. For if the resistor $R_e$ decreases the negative feedback decreases and hence the amplification of transistor T increases. The output signal consequently increases Alternatively, the operation of the resistor $R_e$ may be coupled with that of the contrast control. --.

Signed and sealed this 7th day of April 1970.

(SEAL)

Attest:

Edward M. Fletcher, Jr.

Attesting Officer

WILLIAM E. SCHUYLER, JR.

Commissioner of Patents